United States Patent
Hashimoto

(10) Patent No.: US 10,628,623 B2
(45) Date of Patent: Apr. 21, 2020

(54) NON-TRANSITORY COMPUTER-READABLE RECORDING MEDIUM RECORDING DETOUR WIRING CHECK PROGRAM, DETOUR WIRING CHECK METHOD, AND INFORMATION PROCESSING APPARATUS

(71) Applicant: FUJITSU LIMITED, Kawasaki-shi, Kanagawa (JP)

(72) Inventor: Michitaka Hashimoto, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 91 days.

(21) Appl. No.: 15/841,381

(22) Filed: Dec. 14, 2017

(65) Prior Publication Data
US 2018/0203952 A1 Jul. 19, 2018

(30) Foreign Application Priority Data
Jan. 13, 2017 (JP) .................. 2017-004673

(51) Int. Cl.
| | |
|---|---|
| *G06F 30/3323* | (2020.01) |
| *G06F 30/30* | (2020.01) |
| *G06F 30/39* | (2020.01) |
| *G06F 30/394* | (2020.01) |
| *G06F 30/3312* | (2020.01) |

(Continued)

(52) U.S. Cl.
CPC .......... *G06F 30/3323* (2020.01); *G06F 30/30* (2020.01); *G06F 30/3312* (2020.01); *G06F 30/39* (2020.01); *G06F 30/394* (2020.01); *G06F 2119/06* (2020.01); *G06F 2119/12* (2020.01)

(58) Field of Classification Search
CPC ............... G06F 17/504; G06F 17/5045; G06F 17/5068; G06F 17/5031; G06F 17/5077; G06F 2217/78; G06F 2217/84; G06F 30/3323; G06F 30/3312; G06F 30/394;
(Continued)

(56) References Cited

U.S. PATENT DOCUMENTS 6,990,648 B2 * 1/2006 Palumbo ............. G06F 17/5072
716/111
7,350,173 B1 * 3/2008 Ang ..................... G06F 17/5031
716/114
(Continued)

FOREIGN PATENT DOCUMENTS

| JP | 2006-093631 | 4/2006 |
| JP | 2014-186706 | 10/2014 |

*Primary Examiner* — Nha T Nguyen
(74) *Attorney, Agent, or Firm* — Fujitsu Patent Center

(57) ABSTRACT

A recording medium recording a detour wiring check program, the processing includes: acquiring target feature information regarding a target path in a target circuit and target positional information indicating a position of each cell on the target path; using a storage storing size information regarding a size of a frame used to determine whether there is a possibility that a wiring which couples cells on a path in a circuit detours; determining whether each cell between transmission and reception cells in the target path is included in a frame, which has a size based on target size information corresponding to the target feature information; and outputting that there is the possibility that the wiring which couples each cells on the target path detours when it is determined that at least one cell among the cells between the transmission and reception cells is not included in the frame.

15 Claims, 13 Drawing Sheets

(51) Int. Cl.
    *G06F 119/06*    (2020.01)
    *G06F 119/12*    (2020.01)
(58) Field of Classification Search
    CPC ...... G06F 30/39; G06F 30/30; G06F 2119/12;
                                            G06F 2119/06
    See application file for complete search history.

(56) References Cited

U.S. PATENT DOCUMENTS

| | | | |
|---|---|---|---|
| 8,479,137 B2* | 7/2013 | Lo | G06F 17/50 |
| | | | 716/118 |
| 8,984,464 B1* | 3/2015 | Mihal | G06F 17/5072 |
| | | | 716/118 |
| 9,652,576 B2* | 5/2017 | Mihal | G06F 17/5072 |
| 10,268,795 B2* | 4/2019 | Chuang | G06F 17/5077 |
| 2004/0199883 A1* | 10/2004 | Palumbo | G06F 17/5072 |
| | | | 716/111 |
| 2006/0080628 A1 | 4/2006 | Enomoto et al. | |
| 2007/0079273 A1* | 4/2007 | Lahner | G06F 17/5072 |
| | | | 716/113 |
| 2008/0216040 A1* | 9/2008 | Fumish | G06F 17/5068 |
| | | | 716/122 |
| 2009/0187870 A1* | 7/2009 | Yifrach | G06F 17/5072 |
| | | | 716/119 |
| 2012/0272203 A1* | 10/2012 | Hawk | G06F 17/5077 |
| | | | 716/130 |
| 2014/0289689 A1 | 9/2014 | Furuya et al. | |
| 2014/0337657 A1* | 11/2014 | Watanabe | G06F 17/5077 |
| | | | 713/501 |

\* cited by examiner

FIG. 5

| DEVICE | FEATURE | | | MARGIN AMOUNT |
|---|---|---|---|---|
| | DISTANCE BETWEEN TRANSMISSION AND RECEPTION | NUMBER OF LOGIC STAGES | FREQUENCY [MHz] | |
| AB | 1~10 | ~5 | ~100 | ×4 |
| | | | 101~250 | ×2 |
| | | 6 OR MORE | ~100 | ×2 |
| | | | 101~250 | ×1.2 |
| | 10 OR MORE | ~5 | ~100 | ×2 |
| | | | 101~250 | ×1.2 |
| | | 6 OR MORE | ~100 | ×1.2 |
| | | | 101~250 | ×0.8 |

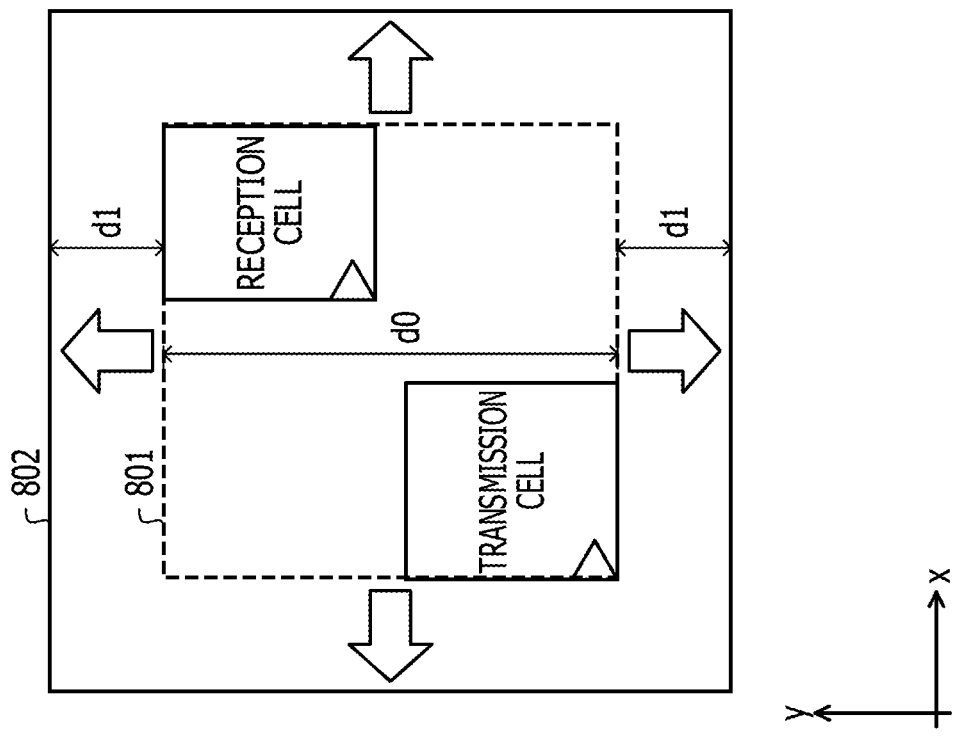
FIG. 8
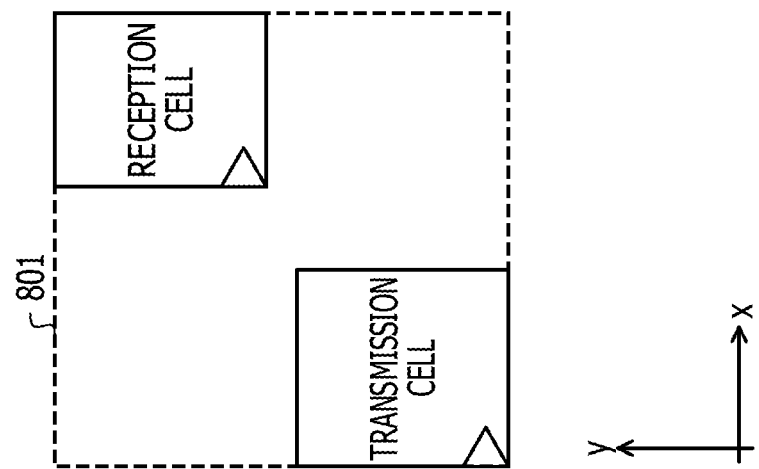

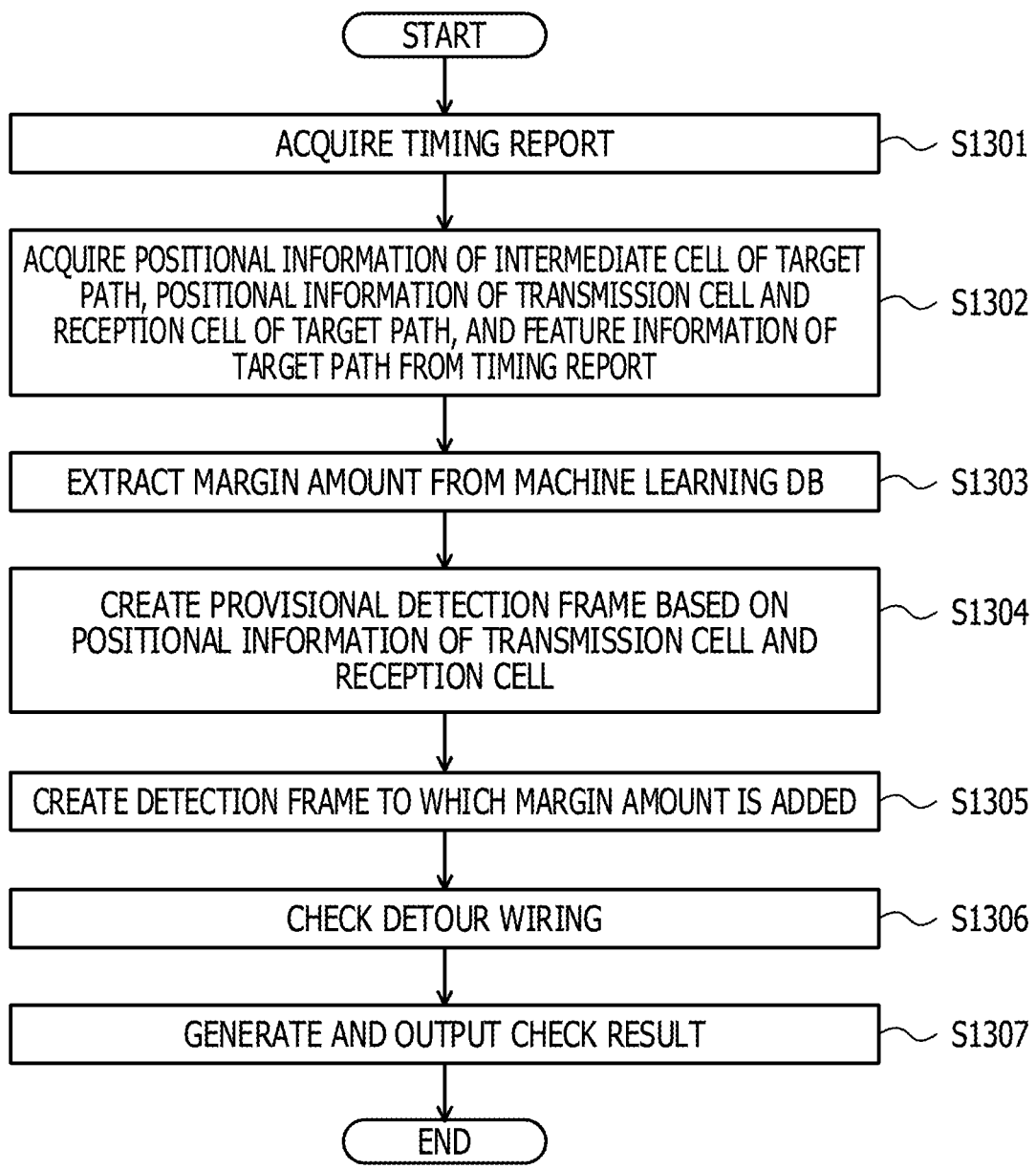

NON-TRANSITORY COMPUTER-READABLE RECORDING MEDIUM RECORDING DETOUR WIRING CHECK PROGRAM, DETOUR WIRING CHECK METHOD, AND INFORMATION PROCESSING APPARATUS

CROSS-REFERENCE TO RELATED APPLICATION

This application is based upon and claims the benefit of priority of the prior Japanese Patent Application No. 2017-004673, filed on Jan. 13, 2017, the entire contents of which are incorporated herein by reference.

FIELD

The embodiments discussed herein are related to a non-transitory computer-readable recording medium recording a detour wiring check program, a detour wiring check method, and an information processing apparatus.

BACKGROUND

In a design of a semiconductor integrated circuit, a register transfer level (RTL) design or a layout design is performed.

Related technologies are disclosed in, for example, Japanese Laid-Open Patent Publication Nos. 2006-093631 and 2014-186706.

SUMMARY

According to one aspect of the embodiments, a non-transitory computer-readable recording medium recording a detour wiring check program for causing a computer to execute a processing, the processing includes: acquiring target feature information regarding a target path to be verified included in a target circuit to be verified and target positional information indicating a position of each of one or more cells on the target path; using a storage storing size information regarding a size of a frame used to determine whether there is a possibility that a wiring which couples one or more cells on a path in a circuit detours in regard to feature information of the path; determining whether each of one or more cells between a transmission cell and a reception cell which are included in the target path is included in a frame, which is installed based on each position of the transmission cell and the reception cell and has a size based on target size information corresponding to the target feature information, based on the target positional information; and outputting that there is the possibility that the wiring which couples each of the one or more cells on the target path detours when it is determined that at least one cell among the one or more cells between the transmission cell and the reception cell is not included in the frame.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 illustrates an example of storage of the machine learning DB;

FIG. 8 illustrates an example of creation of a rectangular detection frame;

FIG. 13 illustrates an example of processing performed by the information processing apparatus.

DESCRIPTION OF EMBODIMENTS

In an RTL design, a user specification is converted to an RTL description. In the RTL design, descriptions on how respective parts of a semiconductor integrated circuit operate every clock cycle are made in a netlist or the like by a hardware description language or the like. In a layout design, a layout is performed based on a gate level netlist obtained by logic synthesis of an RTL netlist. Further, in the layout design, a wiring processing for connecting elements is performed after an arrangement processing for arranging the elements is performed.

For example, in the design of the semiconductor integrated circuit, an inter-element distance is extracted from layout data to calculate a variation value, and an allowable range of element arrangement is set.

For example, in layout verification of the semiconductor integrated circuit, provisional wiring information is acquired to specify arrangement information, and it is determined whether there is a detour wiring.

For example, when a timing error occurs due to the detour wiring caused by a poor cell arrangement on a path, a design process may be re-worked. For example, when the detour wiring is found at a final stage of the layout design process, for example, after the wiring processing, the detour wiring may be modified by returning to the process such as the RTL design, the logic synthesis, the arrangement processing, and the like.

For example, a detour wiring check program, a detour wiring check method, and an information processing apparatus for suppressing rework of the design process may be provided.

Figure 1:
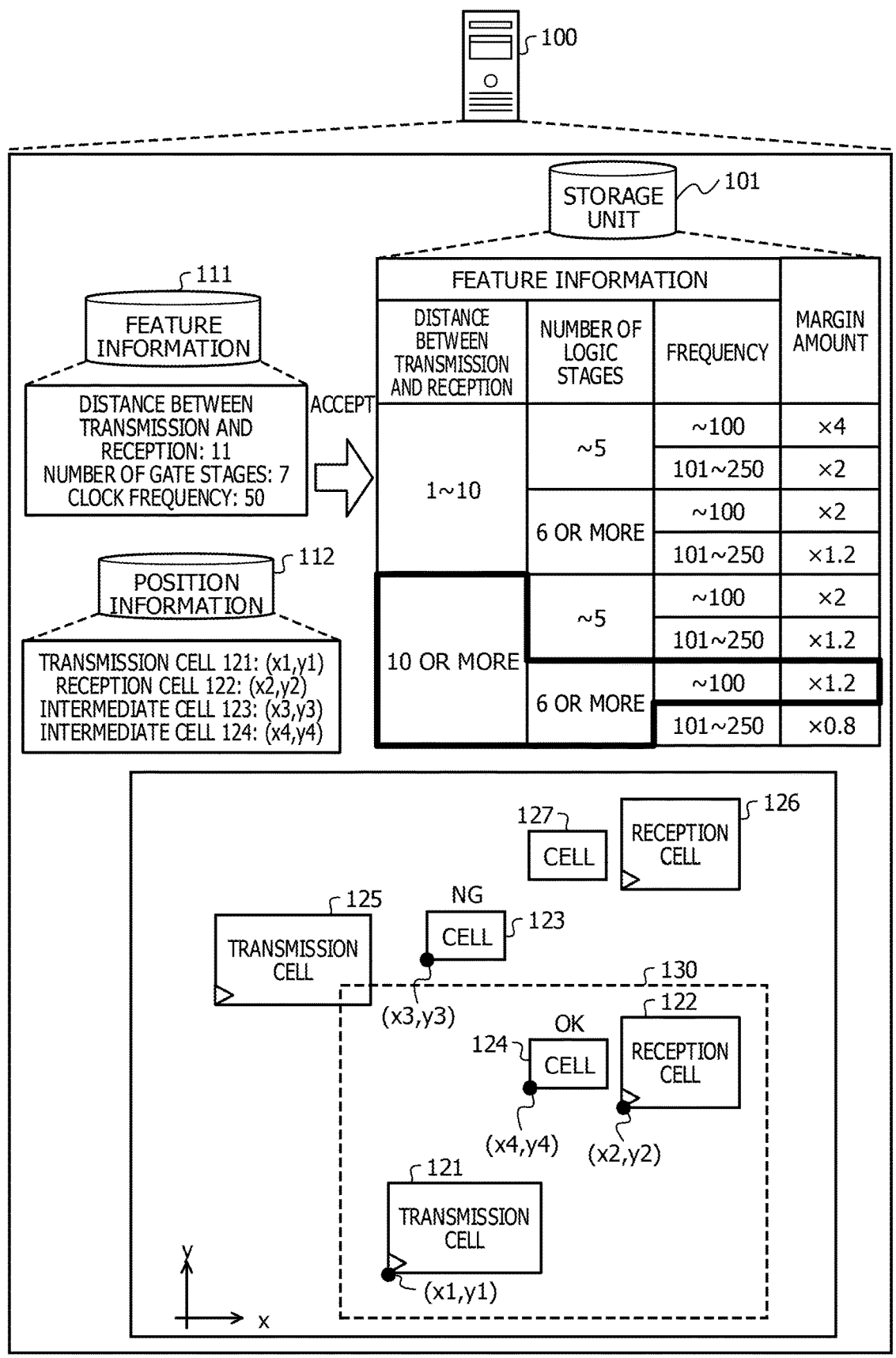
FIG. 1 illustrates an example of an operation of an information processing apparatus.

FIG. 1 illustrates an example of an operation of an information processing apparatus. The information processing apparatus 100 is, for example, a computer having a function of checking the detour wiring in the layout design of the semiconductor integrated circuit.

For example, in designing the semiconductor integrated circuit, the RTL design, the logic synthesis, the layout design, and the like are performed. A gate level netlist is obtained by logically synthesizing the RTL netlists. In the layout design, the arrangement processing for arranging the cells based on the gate level netlist is performed. Next, in the layout design, a wiring processing is performed to connect the cells.

For example, when a timing error occurs due to the detour wiring caused by a poor cell arrangement on a path, the design process may be re-worked. For example, when the detour wiring is found at a final stage of the layout design process, for example, after the wiring processing, the detour wiring may be modified by returning to the process such as the RTL design, the logic synthesis, the arrangement processing, and the like. For example, it takes several hours for the logic synthesis or the arrangement processing, while it takes several tens of hours for the wiring processing or timing verification after the wiring processing. Therefore, when a re-work occurs in the process due to the detour wiring, a re-attempt of the wiring processing occurs, and a time for the entire logic circuit design and layout design becomes long. In addition, determination on whether the timing error occurs due to the detour wiring is made by visual evaluation of a designer. For this reason, it is difficult to determine whether the detour wiring is caused by poor arrangement of the cells on the path because of different evaluation criteria depending on the designer or the like.

The information processing apparatus 100 determines whether there is a possibility that a wiring between the cells detour by considering whether each cell on a target path is included in a frame having a size according to the feature information of the target path by referring to size information of a detection frame for each piece of path feature information. As a result, the information processing apparatus 100 may check the detour wiring that may be caused by the arrangement of the cells before the wiring processing. Therefore, the information processing apparatus 100 may suppress the design rework. Furthermore, the design time may be shortened. The information processing apparatus 100 may enhance detection precision by changing the size of the detection frame according to the feature of the path.

Herein, the path is, for example, a path between data holding elements, a path from an input terminal to the data holding element, and a path from the data holding element to an output terminal. The data holding element may include, for example, an FF, and the like. The FF or the input terminal that is a start point of the path is also referred to as, for example, a transmission cell. The FF or the output terminal that is an end point of the path is also referred to as, for example, a reception cell. Further, each cell between the reception cell and the transmission cell is also referred to as an intermediate cell.

A storage unit 101 stores, for example, size information regarding the size of a frame used for determining whether there is a possibility that the wiring connecting between the respective cells on the path detour for each piece of feature information on the path in the circuit designed in the past. The feature information is, for example, at least one of a distance between transmission and reception, the number of logic stages, a frequency, and the like. The distance between transmission and reception is a distance between the reception cell and the transmission cell. The number of logic stages is the number of stages of gates on the path between the reception cell and the transmission cell. Herein, the gate is a (macro) cell including a transistor included in the logic circuit. Examples of the gate may include a NOR gate, an OR gate, an inverter gate, a buffer gate, and the like. As the frequency, a maximum frequency at which the path is operated is set.

In FIG. 1, the size information on the size is represented by, for example, a margin amount. The margin amount is a ratio indicating how many times the area of a provisional frame having a smallest shape including the transmission cell and the reception cell is set. Herein, the frame is also referred to as the detection frame. The shape of the detection frame 130 may be, for example, a rectangular shape as illustrated in FIG. 1 or a circular shape, and is not particularly limited.

The information processing apparatus 100 acquires feature information 111 on the target path for verification included in a target circuit for verification and positional information 112 indicating the position of each cell on the target path. The feature information 111 includes information indicating the distance between transmission and reception, the number of gate stages, and a clock frequency. The positional information 112 indicates the positions of a transmission cell 121, a reception cell 122, an intermediate cell 123, and an intermediate cell 124.

The information processing apparatus 100 determines whether each cell on the target path is included in the detection frame 130 installed based on the position of each of the transmission cell of the target path and the reception cell of the target path and having the size based on the size information regarding the feature information 111, based on the storage unit 101 and the positional information 112. For example, the information processing apparatus 100 is provided with, for example, a detection frame 130 having a size indicated by the size information regarding the acquired feature information 111 based on the position of each of the transmission cell of the target path and the reception cell of the target path. For example, the information processing apparatus 100 is provided with, for example, a provisional detection frame 130 having a minimum rectangular shape, which includes the transmission cell of the target path and the reception cell of the target path based on the position of each of the transmission cell of the target path and the reception cell of the target path. The information processing apparatus 100 extracts the size related to the size information on the feature information 111 from the storage unit 101. Herein, "×1.2" is extracted. Then, the information processing apparatus 100 is provided with a detection frame 130 having a size acquired by multiplying the size related to the size information on the feature information 111 acquired with respect to the provisional detection frame 130. By such a configuration, the detection frame 130 having the size based on the size information on the acquired feature information 111 is set.

The information processing apparatus 100 determines whether each cell is included in the detection frame 130 based on the positional information 112. Herein, a pattern size of each cell may be preliminarily made into a library. For example, when at least a part of the cell is not included in the detection frame 130, the information processing apparatus 100 determines that the cell is not included in the detection frame 130.

When the information processing apparatus 100 determines that at least one cell among the cells on the target path is not included in the frame, the information processing apparatus 100 outputs that there is a possibility that the wiring connecting the cells on the target path detour. For example, the information processing apparatus 100 may create a report and store the report in the storage unit 101 or the like or may output to a screen of a display or the like that there is the possibility that the wiring connecting each cell on the target path detour.

In FIG. 1, the intermediate cell 123 is not included in the detection frame 130. The cells on the path from the transmission cell 125 to the reception cell 126 are the intermediate cell 123 and the intermediate cell 127. As described above, the intermediate cell 123 is not only a cell on the path from the transmission cell 121 to the reception cell 122 but also a cell on the path from the transmission cell 125 to the reception cell 126. Therefore, the intermediate cell 123 is located near the transmission cell 125. The information processing apparatus 100 outputs that there is a possibility that the wiring connecting the intermediate cell 123 on the target path detour.

As a result, the information processing apparatus 100 may check the detour wiring that may become a timing error caused by the arrangement of the cells before the wiring processing. Therefore, the information processing apparatus 100 may prevent the design rework. Further, since the size of the detection frame is determined based on the path feature information, detection accuracy of the detour wiring may be enhanced.

Figure 2:
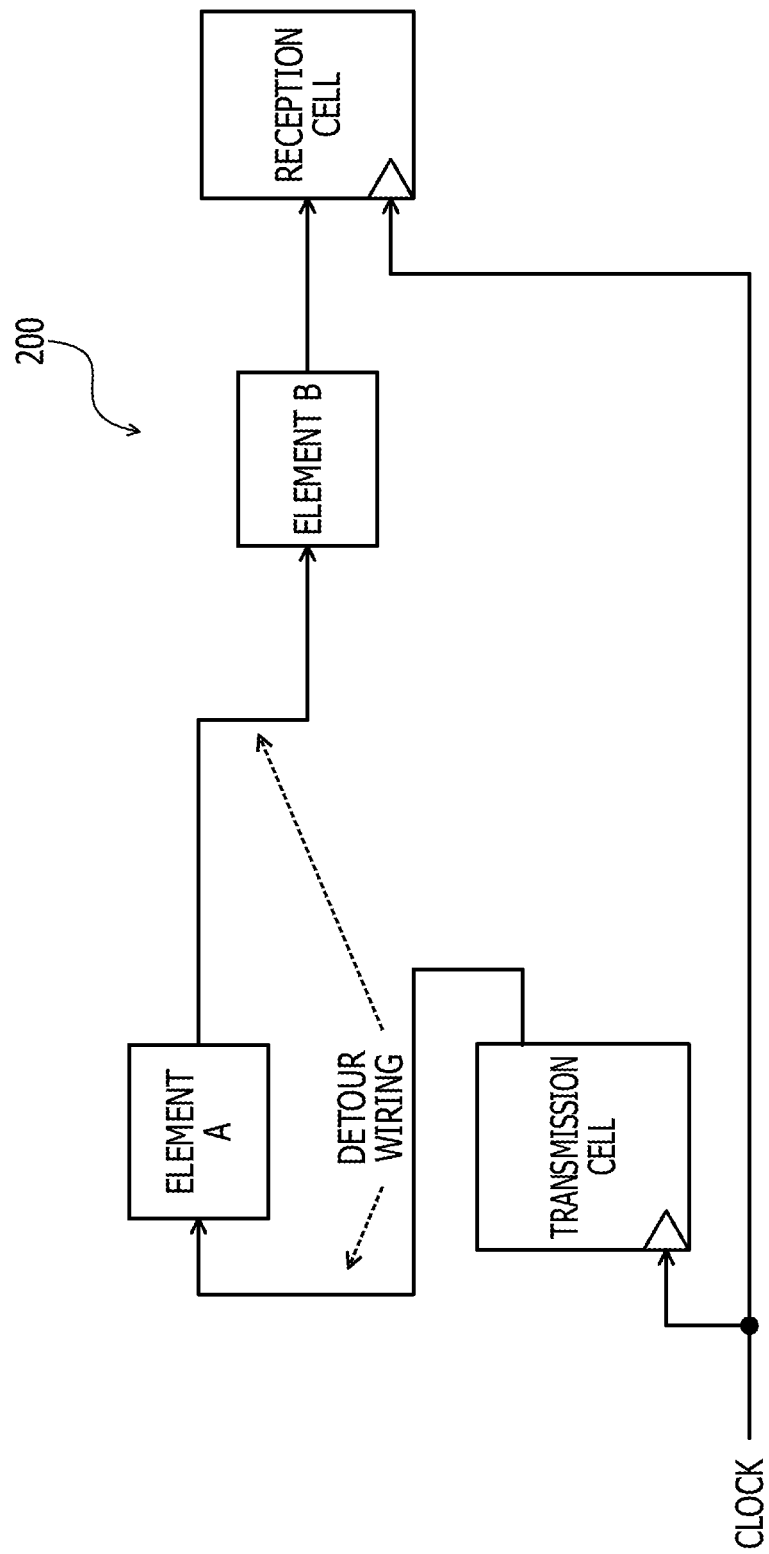
FIG. 2 illustrates an example of a detour wiring.

FIG. 2 illustrates an example of a detour wiring. For example, there are elements A and B on a path 200 from the transmission cell to the reception cell. In the path 200, for example, the element A may be an element on a path other than the path 200. In such a case, due to an influence of an arrangement result of another path, the element A may be disposed far from the transmission cell or the element B.

Figure 3:
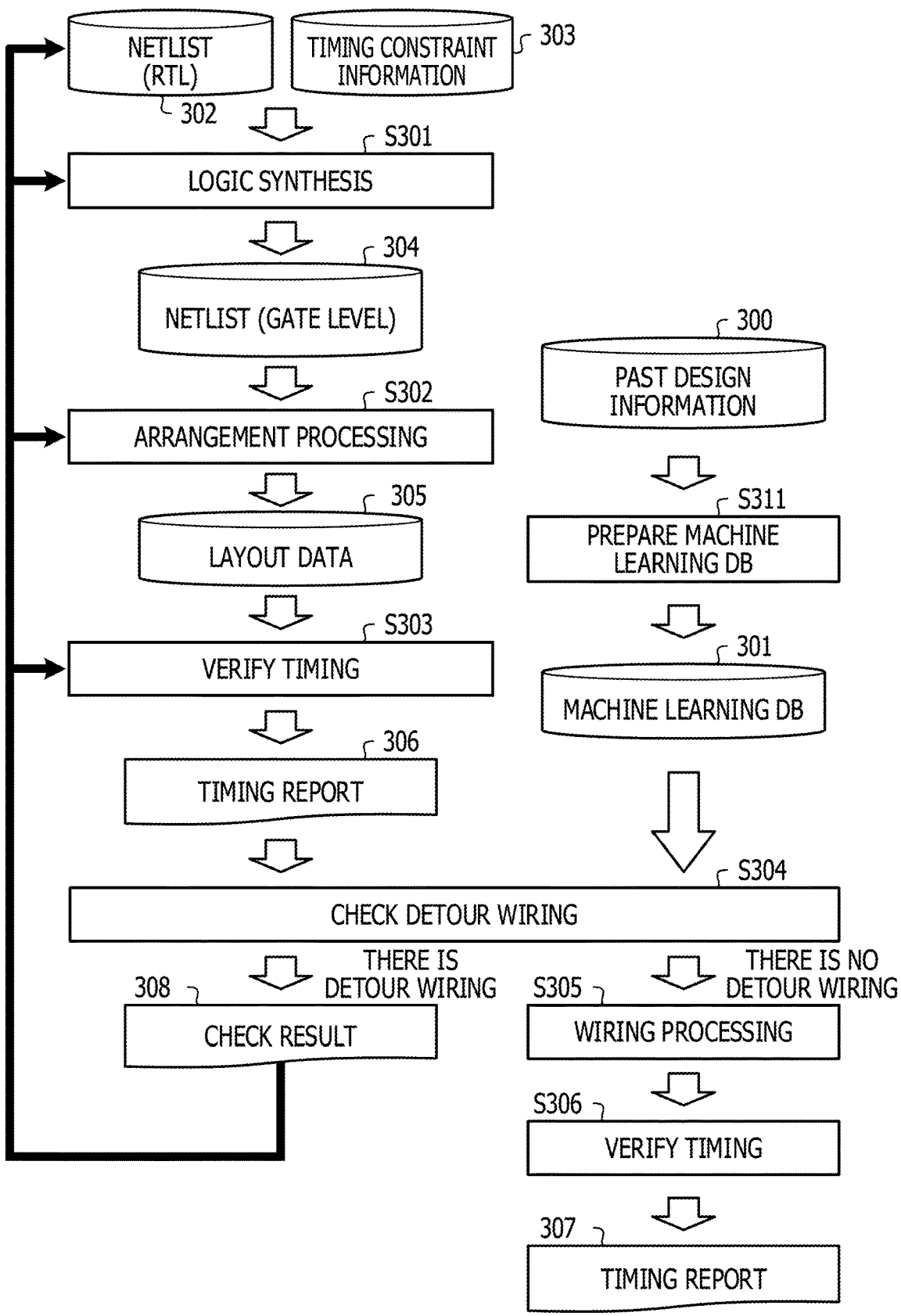
FIG. 3 illustrates an example of an entire design flow using a machine learning DB.

FIG. 3 illustrates an example of an entire design flow using a machine learning DB. A machine learning DB 301 is created based on past design information 300 or experience values (operation S311). The past design information 300 includes, for example, layout data after layout design of past circuits or a timing report of timing verification for the layout data. In operation S311, for example, a developer or a designer of a circuit in the past creates the machine learning DB 301.

Logic synthesis is performed based on an RTL netlist 302 in which a user specification is described in the register transfer level or timing constraint information 303 (operation S301). In the RTL netlist 302, how respective parts of the semiconductor integrated circuit operate every clock cycle is described by a hardware description language or the like. In operation S301, the RTL netlist 302 is logically synthesized to obtain a gate level netlist 304.

The arrangement processing depending on the netlist 304 after the logic synthesis is performed (operation S302). Next, the timing verification is performed based on the layout data 305 after the arrangement and the netlist 304 after the logic synthesis (operation S303). Thus, a timing report 306 is obtained.

The information processing apparatus 100 checks the detour wiring based on the machine learning DB 301 and the timing report 306 (operation S304). Thus, a check result 308 is obtained. When it is determined that there is the detour wiring in operation S304, operations S301, S302, S303, and the like are performed again based on the check result 308. When it is determined that there is no detour wiring in operation S304, the wiring processing is performed (operation S305). The timing verification is performed (operation S306). Thus, the timing report 307 is obtained.

Figure 4:
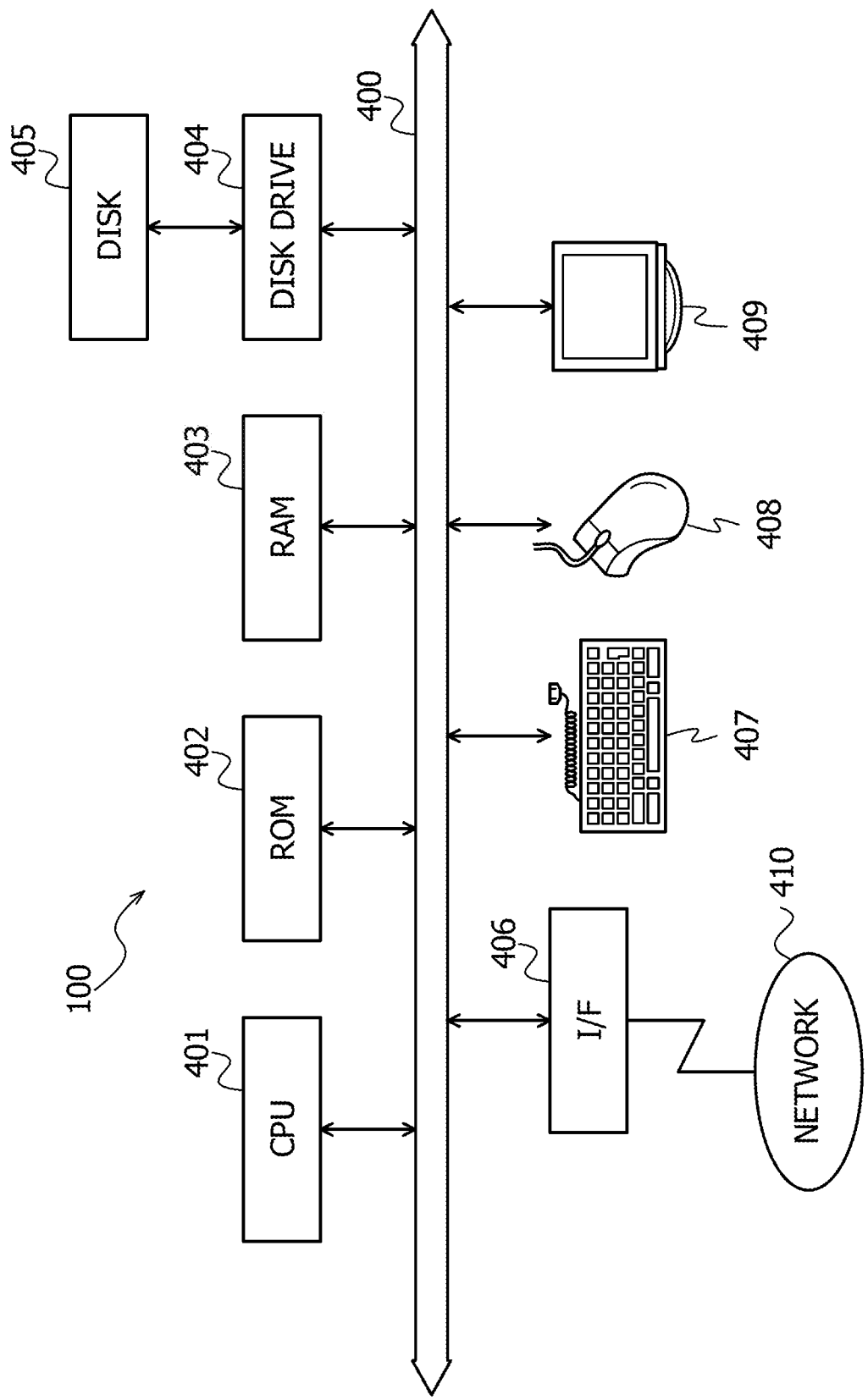
FIG. 4 illustrates an example of a hardware configuration of the information processing apparatus.

FIG. 4 illustrates an example of a hardware configuration of the information processing apparatus. In FIG. 4, the information processing apparatus 100 includes a central processing unit (CPU) 401, a ROM 402, a RAM 403, a disk drive 404, and a disk 405. The information processing apparatus 100 includes an interface (I/F) 406, a keyboard 407, a mouse 408, and a display 409. Further, each of the CPU 401, the ROM 402, the RAM 403, the disk drive 404, the I/F 406, the keyboard 407, the mouse 408, and the display 409 are coupled via a bus 400.

The CPU 401 serves to control the entire information processing apparatus 100. The ROM 402 stores a program such as a boot program or the like. The RAM 403 is used as a work area of the CPU 401. The disk drive 404 controls reading/writing of data from/to the disk 405 under the control of the CPU 401. The disk 405 stores the data written under the control of the disk drive 404. Examples of the disk 405 may include a magnetic disk, an optical disk, and the like.

The I/F 406 is connected to a network 410 such as a local area network (LAN), a wide area network (WAN), the Internet, or the like via a communication line and is coupled to other devices via the network 410. The I/F 406 serves as an interface between the network 410 and the inside and controls input/output of data to/from an external device. The I/F 406 may adopt, for example, a modem or a LAN adapter.

The keyboard 407 or the mouse 408 is an interface that accepts input of various data by user's operation. The display 409 is an interface for outputting data in response to an instruction from the CPU 401.

The information processing apparatus 100 may be provided with an input device for accepting images and moving images from a camera or an input device for accepting sound from a microphone. Further, although not illustrated, the information processing apparatus 100 may be provided with an output device such as a printer or the like.

Although a personal computer is taken as an example of the hardware configuration of the information processing apparatus 100, the hardware configuration is not limited thereto and may be a server or the like. In the case where the information processing apparatus 100 is a server, the information processing apparatus 100 and a device operable by the user, the display 409, or the like may be coupled via the network 410.

Various databases (DBs) possessed by the information processing apparatus 100 is implemented by a storage unit of a non-volatile semiconductor memory (not illustrated) such as the ROM 402, the RAM 403, the disk 405, a flash memory, and the like possessed by the information processing apparatus 100.

FIG. 5 illustrates an example of storage of the machine learning DB. The machine learning DB 301 is information in which the largest value or the smallest value in each of a plurality of regions corresponds to feature information such as a manufacturer, a device, a frequency or the like for each cause of the timing error.

The machine learning DB 301 has fields of features and margin amounts. The field of the feature includes fields of the device, the distance between transmission and reception, the number of logic stages, and the frequency. Information set in the field of the device is feature information on the use of the target circuit of the design. Information set in the fields of the distance between transmission and reception, the number of logic stages, and the frequency is feature information of each path included in the target circuit of the design.

In the field of the device, a device name is set as identification information of target FPGA. In the field of the distance between transmission and reception, for example, the distance between the FF which is the start point of the path or the input terminal and the FF which is the end point of the path or the output terminal is set. When the distance between transmission and reception is too long, the timing error may occur due to an increase in wiring delay. The distance between transmission and reception is represented by a unit of length on a computer space used for CAD for layout.

In the field of the number of logic stages, the number of stages of a gate on the path is set. Herein, the gate is a (macro) cell including a transistor included in the logic circuit. Examples of the gate may include a NOR gate, an OR gate, an inverter gate, a buffer gate, and the like. In the field of the frequency, the maximum frequency at which the target circuit of the design is operated is set.

In the field of the margin amount, the margin amount for a reference detection frame is set. The reference detection frame is the smallest detection frame including the transmission cell and reception cell of the target path. For example, the margin amount is set to be smaller as the distance between transmission and reception is larger. Further, for example, the margin amount is set to be smaller as the number of logical stages is larger. In addition, the margin amount is set to be smaller as the frequency is higher. Herein, the margin amount is represented by "× numerical value." The "× numerical value" indicates a ratio indicating how many times the area of the provisional detection frame is set.

For example, when the device is "AB," the distance between transmission and reception is "1 to 10," the number of logical stages is "5 or less," and the frequency is "100 [MHz]," the margin amount is set to "×4." In such a case, a detection frame is generated in which the length of the provisional detection frame of each of an x axis and a y axis defined on the computer space used in the CAD for the layout is increased by "×4×½." The provisional detection frame is a temporary frame for creating the detection frame. As a result, a detection frame having an area four times as large as the provisional detection frame is created. The provisional detection frame or the detection frame will be described later with reference to FIG. 8 or 9.

Figure 6:
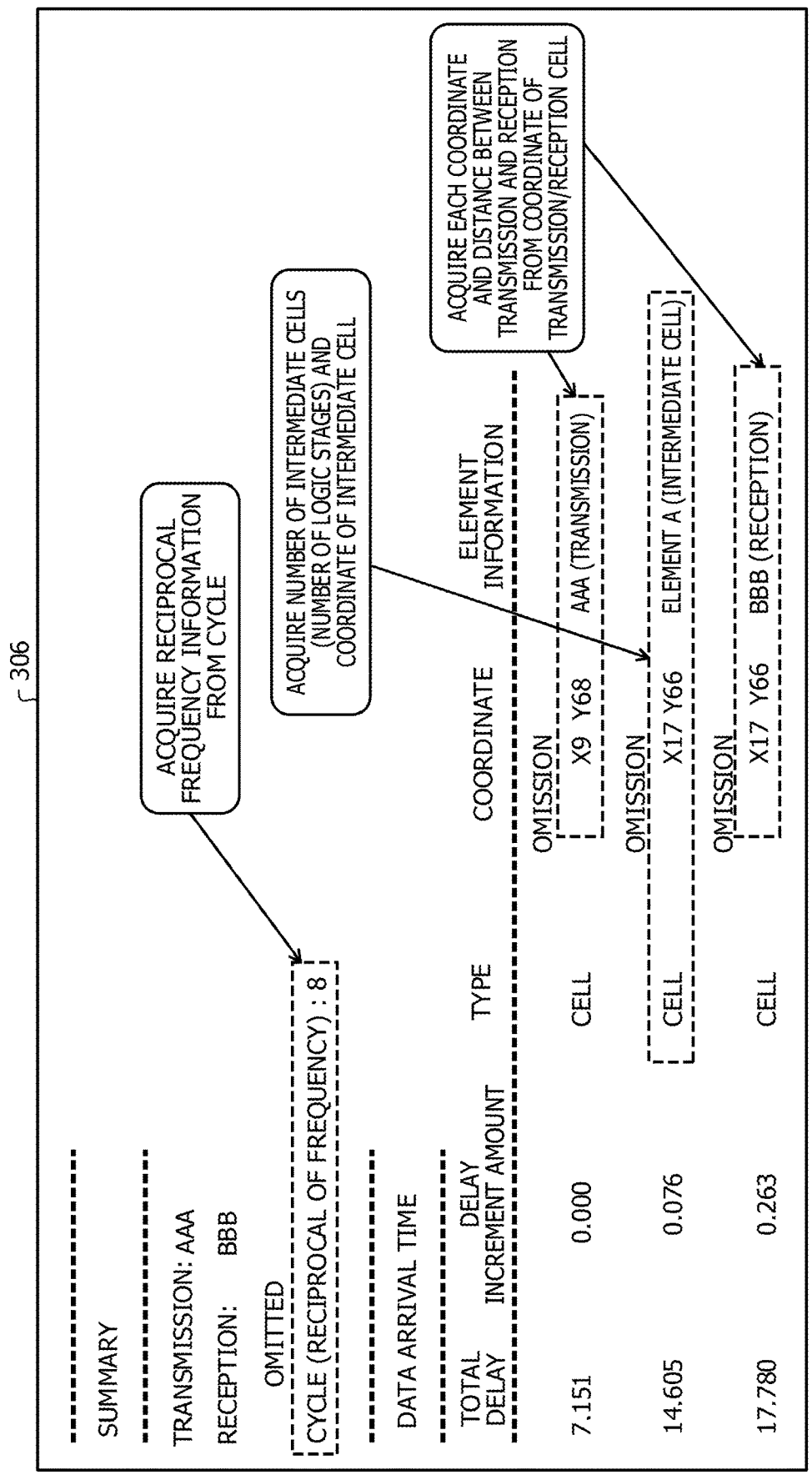
FIG. 6 illustrates an example of one storage of a timing report.

FIG. 6 illustrates an example of storage of a timing report. The timing report 306 is a report obtained by the timing verification by operation S303 of FIG. 3.

The timing report 306 includes a summary column and a data arrival time column. In the summary column, identification information between the transmission cell and the reception cell of the path is set. Further, in the summary column, information on a cycle of a clock at which the path operates is set. In addition, the cycle is a reciprocal of the frequency of the clock. The information processing apparatus 100 acquires the information on the cycle from the timing report 306 to obtain frequency information of the reciprocal of the cycle.

The column of the data arrival time has columns of total delay, a delay increment amount, a type, a coordinate, and element information. In the column of the total delay, a delay amount of a total up to each element on the path is set. In the column of the delay increment amount, delay of each element on the path is set. In the column of the type, the type of each element on the path is set. An example of the type of the element may include "CELL" indicating the cell. In the column of the coordinate, a coordinate value of each element is set as the positional information indicating the position of each element on the path. In the column of the element information, element information regarding each element on the path is set. As the element information, identification information of the element and information indicating whether the element is the transmission cell, the reception cell, or the intermediate cell are set. The information processing apparatus 100 obtains the positional information indicating the position of each cell on the path by acquiring the coordinate value of the transmission cell, the coordinate value of the reception cell, and the coordinate value of each intermediate cell. The information processing apparatus 100 may obtain the distance between transmission and reception by acquiring the coordinate value of the transmission cell and the coordinate value of the reception cell. Further, the information processing apparatus 100 may obtain the number of logic stages by counting the number of intermediate cells.

Figure 7:
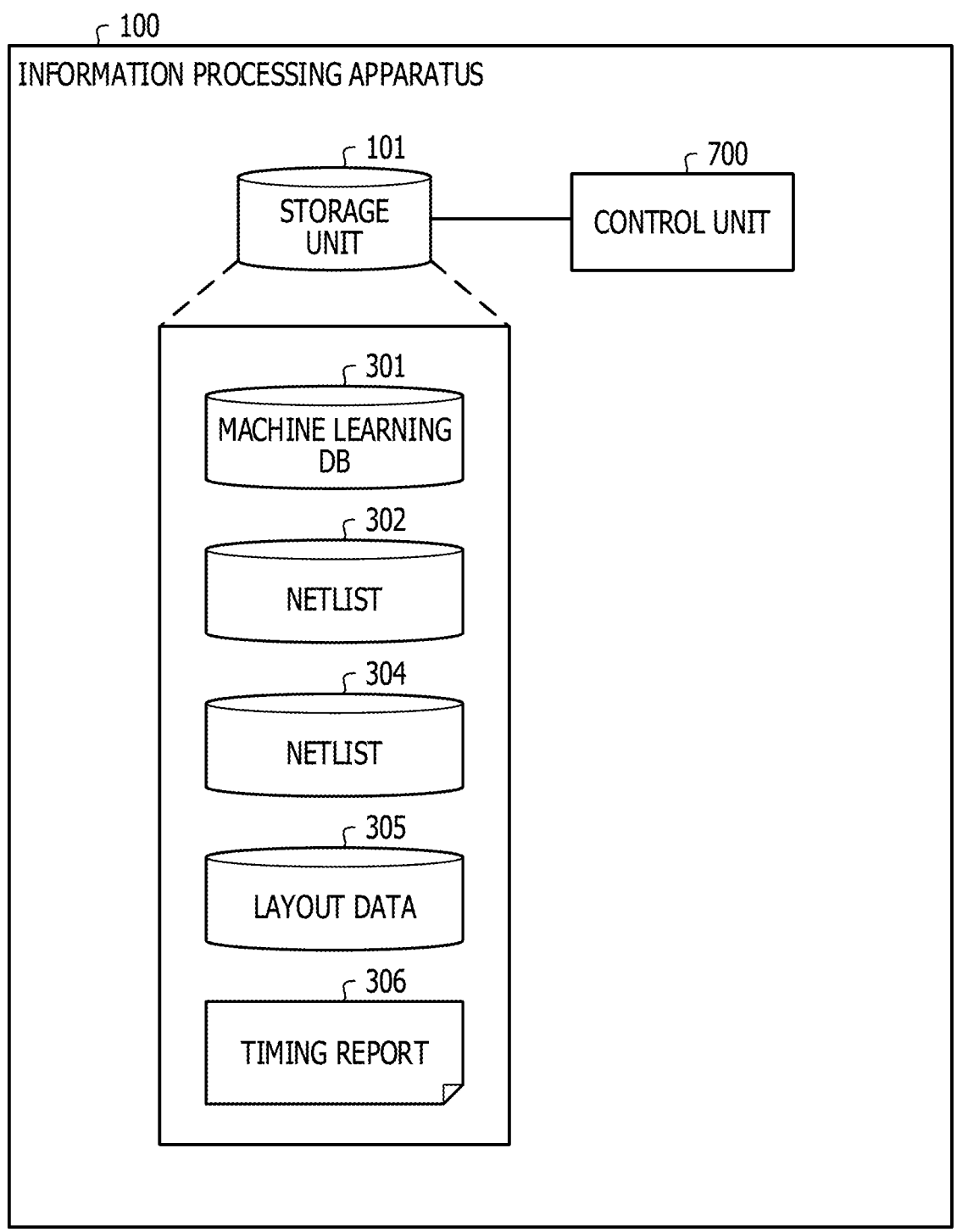
FIG. 7 illustrates an example of a functional configuration of the information processing apparatus.

FIG. 7 illustrates an example of a functional configuration of the information processing apparatus. The information processing apparatus 100 includes a control unit 700 and a storage unit 101. The processing of the control unit 700 is coded in a program stored in a storage device such as the ROM 402, the RAM 403, the disk 405 or the like accessible by the CPU 401 illustrated in FIG. 4. In addition, the CPU 401 reads the program from the storage device and executes the processing coded in the program. Thus, the processing of the control unit 700 is implemented. Further, a processing result of the control unit 700 is stored in the storage device such as the RAM 403, the ROM 402, the disk 405 or the like.

The storage unit 101 includes, for example, the machine learning DB 301, the RTL netlist 302, the gate level netlist 304, the layout data 305, and the timing report 306.

The control unit 700 acquires the feature information on the target path for verification included in the target circuit for verification. The control unit 700 acquires the positional information indicating the position of each cell on the target path.

For example, the control unit 700 acquires the timing report 306. Next, the control unit 700 acquires the feature information of the target path from the timing report 306. For example, the control unit 700 acquires the distance between transmission and reception, the number of logic stages of the target path, and the frequency used in the target path as the feature information of the target path. Further, the control unit 700 acquires, for example, the positional information indicating the position of the intermediate cell between the transmission cell on the target path and the reception cell on the target path from the timing report 306. The control unit 700 acquires, for example the positional information indicating the positions of the transmission cell and the reception cell on the target path from the timing report 306.

Next, the control unit 700 generate frame information indicating a frame installed based on the position of each of the transmission cell of the target path and the reception cell of the target path and having the size depending on the information indicating the size related to the acquired feature information, based on the acquired positional information by referring to the storage unit 101. The frame is created on, for example, the computer space of the CAD for the layout design. The frame information is frame information such as that the frame is created on the computer space of the CAD for the layout design. The shape of the frame may include the rectangular shape or the circular shape.

For example, the control unit 700 generates provisional frame information indicating the provisional detection frame having the largest outer shape enclosing the transmission cell and the reception cell, for example, based on the positional information of the transmission cell and the reception cell. The control unit 700 acquires the information on the size related to the acquired feature information. For example, the control unit 700 acquires the margin amount corresponding to the acquired feature information. The control unit 700 generates the frame information indicating the detection frame in which the margin amount is included in the provisional detection frame.

The control unit 700 determines whether each cell on the target path is included in the frame indicated by the frame information, based on the positional information of each cell on the target path.

When it is determined that any one cell on the target path is not included in the detection frame indicated by the frame information, the control unit 700 outputs information indicating that there is the possibility that the wiring coupling the cells on the target path detour.

When the control unit 700 determines that all cells on the target path are included in the detection frame, the control unit 700 acquires new various information from the timing report 306 with a separate path included in the target circuit as a new target path. Since the size of the detection frame varies for each path, the detection frame is created for each path. When it is determined that all paths included in the target circuit are included in the detection frame, the process of the wiring processing is performed as illustrated in FIG. 3.

FIG. 8 illustrates an example of creation of a rectangular detection frame. The control unit 700 generates, for example, provisional frame information indicating a rectangular provisional detection frame 801. The provisional detection frame 801 is, for example, a rectangular frame having the largest outer shape surrounding the transmission cell and the reception cell. For example, the control unit 700 generates frame information indicating a detection frame 802 in which the margin amount is added to the provisional detection frame 801 indicated by the provisional frame information. In the example of FIG. 8, the margin amount is "×2."

The detection frame 802 in which the length of the provisional detection frame is increased by a length of the provisional detection frame 801 ×½×½ in both a positive direction and a negative direction of the x axis and the positive direction and the negative direction of the y axis is created. In FIG. 8, "d 0/2=d1×2." The detection frame 802 become one time by aggregation of the positive direction and the negative direction on the y axis. As a result, the detection frame 802 having an area twice as large as the provisional detection frame 801 is obtained.

In FIG. 8, the control unit 700 equally enlarges the provisional detection frame 801 in the positive direction and the negative direction of the x axis and equally increases the provisional detection frame 801 on the x axis and the y axis, but the present disclosure is not limited thereto. For example, the ratio to the positive direction and the negative direction of the x axis or the ratio of the x axis and the y axis may be varied depending on the operation input by the user.

Figure 9:
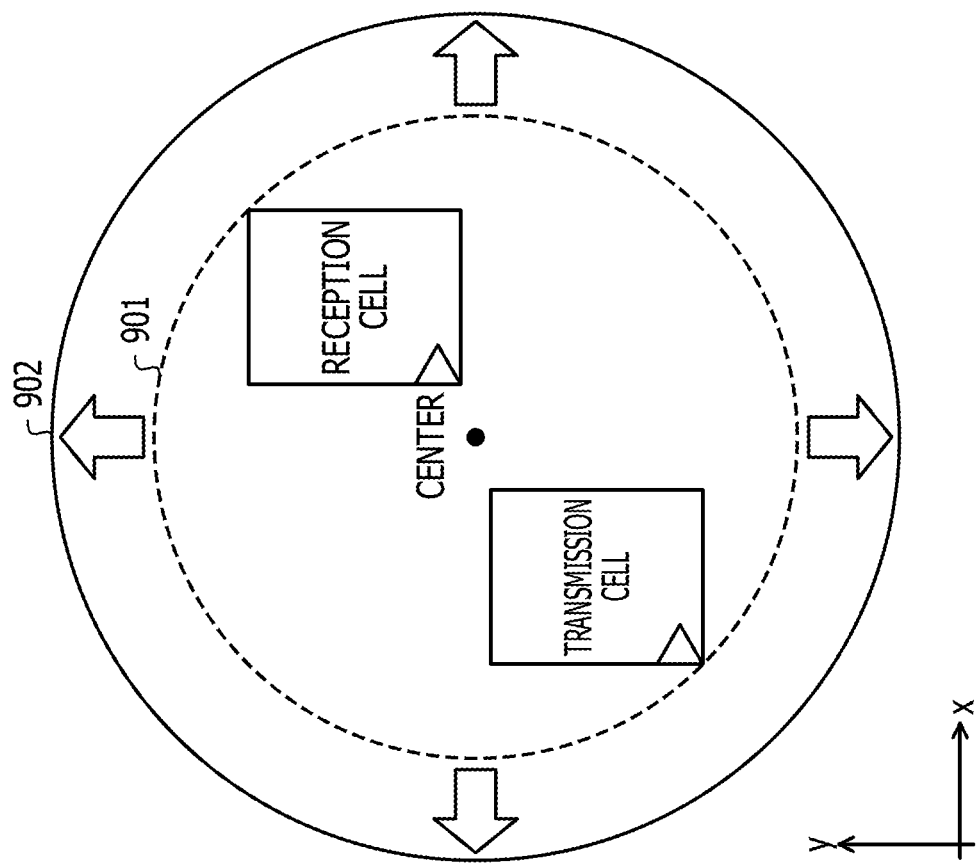
FIG. 9 illustrates an example of creation of a circular detection frame.
Figure 9:
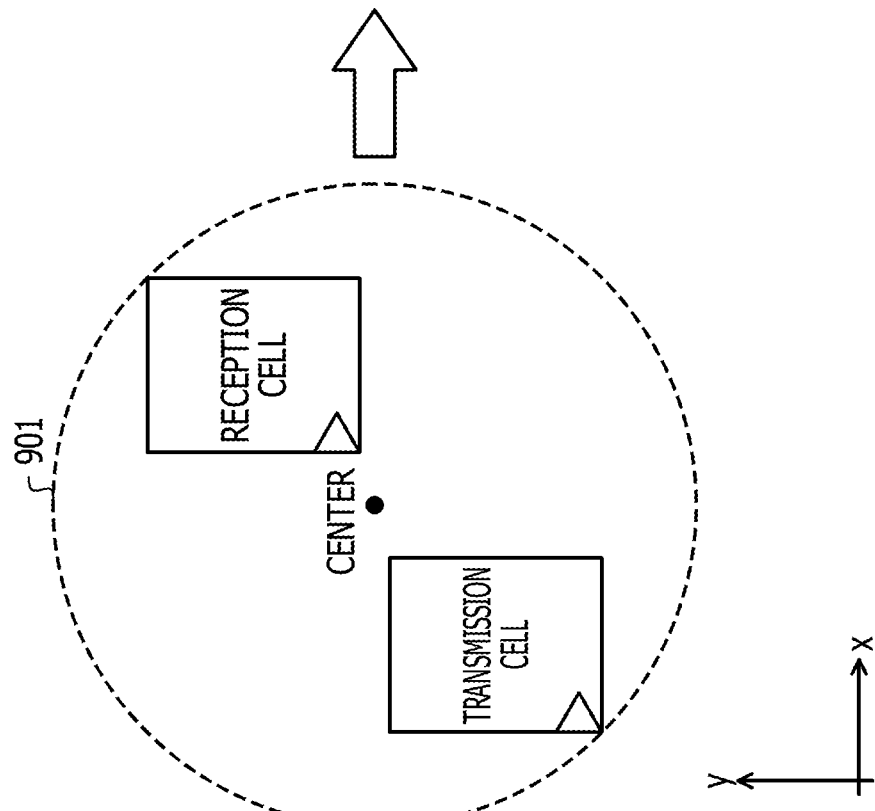

FIG. 9 illustrates an example of creation of a circular detection frame. The control unit 700 calculates, for example, an intermediate position between the reception cell and the transmission cell based on the positional information indicating the reception cell and the transmission cell. Next, the control unit 700 generates the provisional frame information indicating a smallest circular detection frame surrounding the largest outer shape of the transmission cell and the reception cell, for example, with the intermediate position as a center. A provisional detection frame 901 is, for example, a circular frame having the largest outer shape surrounding the transmission cell and the reception cell.

For example, the control unit 700 generates frame information indicating a detection frame 902 in which the margin amount is added to the provisional detection frame 901 indicated by the provisional frame information. In FIG. 9, similarly as in FIG. 8, the case where the margin amount is "×2" is taken as an example.

Figure 10:
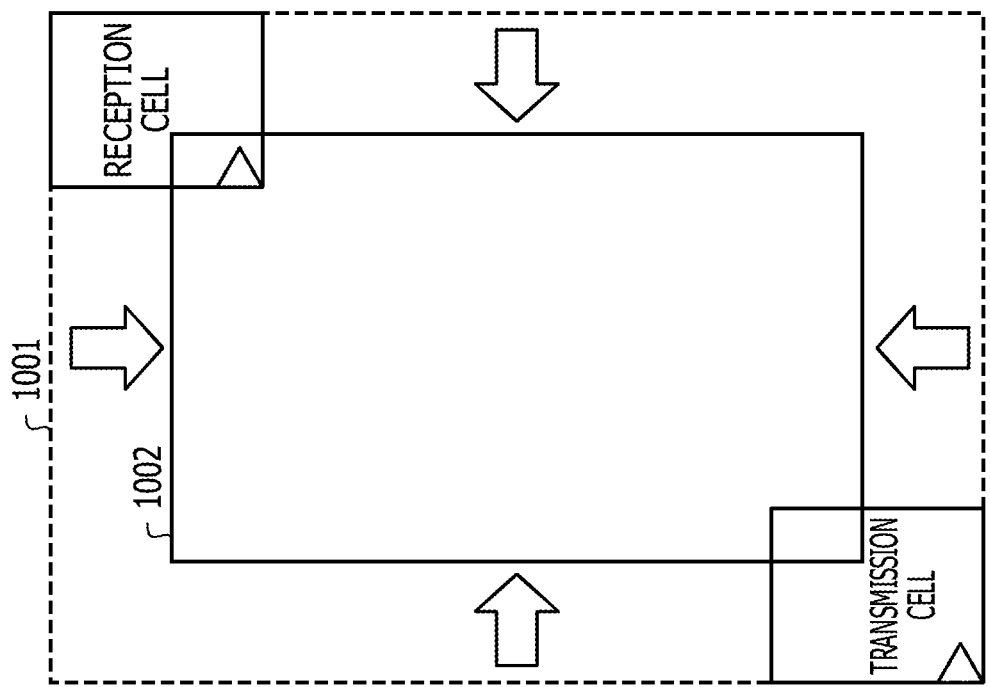
FIG. 10 illustrates an example in which the detection frame is smaller than a provisional detection frame.
Figure 10:
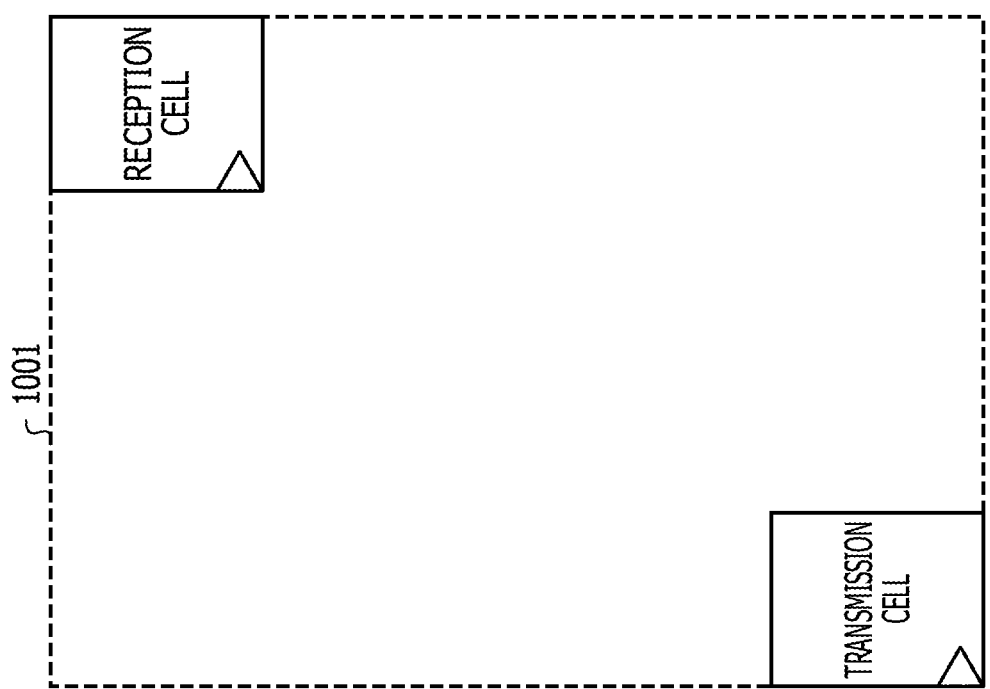

FIG. 10 illustrates an example in which the detection frame is smaller than a provisional detection frame. For example, a detection frame 1002 may become smaller than a provisional detection frame 1001, for example, when the distance between transmission and reception of the path is too long, when the number of logic stages is too large, when the frequency is too high, or the like. In the example of FIG. 10, since the distance between transmission and reception is too far, the detection frame 1002 becomes small.

Figure 11B:
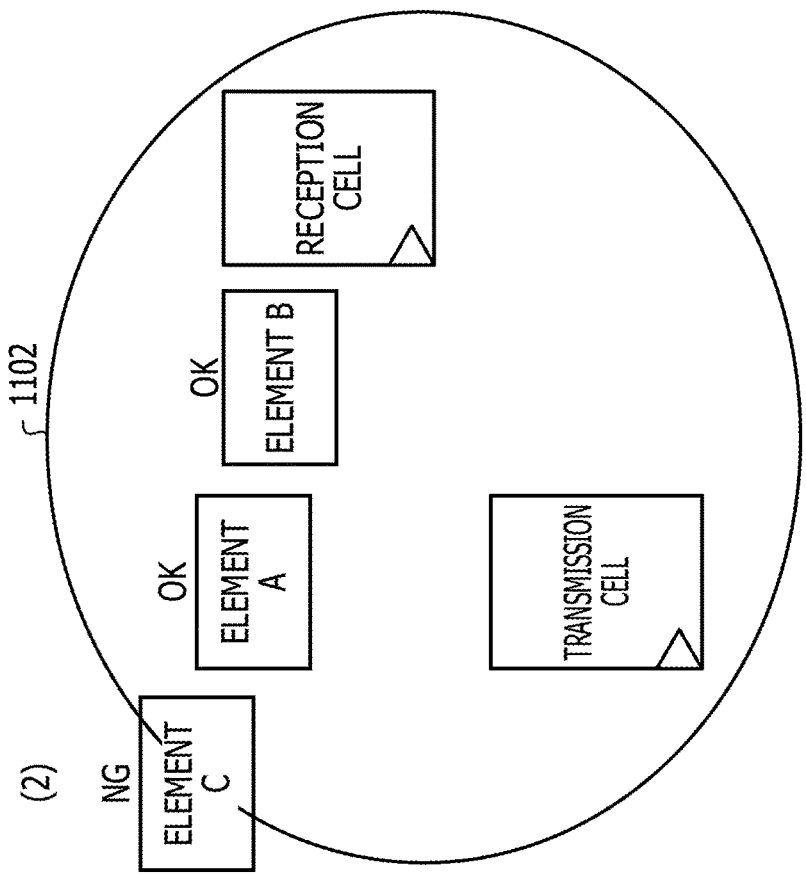
FIGS. 11A and 11B illustrate an example of determination.
Figure 11A:
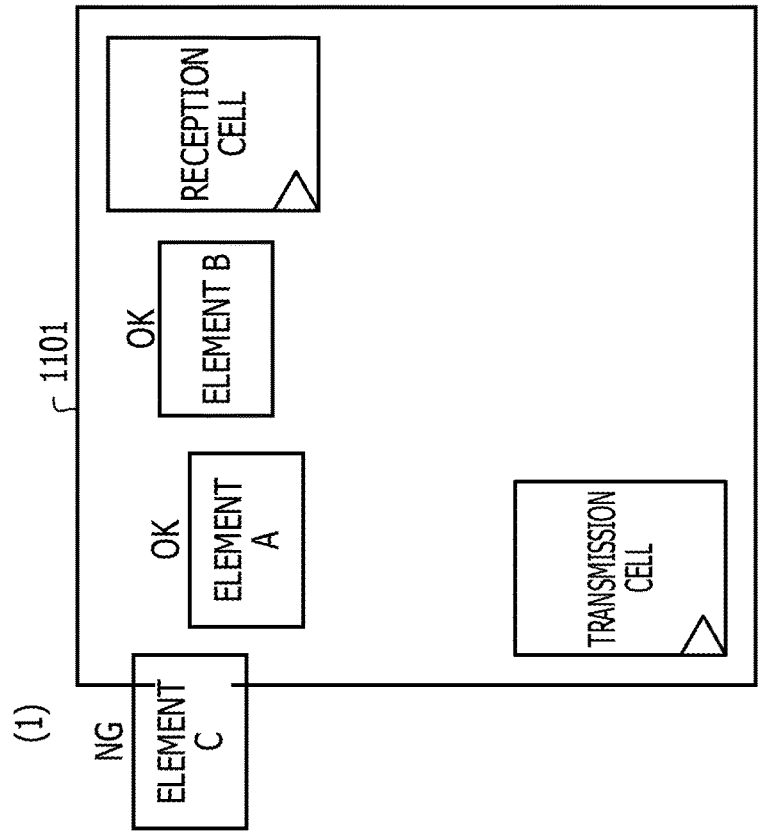

FIGS. 11A and 11B illustrate an example of determination. For example, the control unit 700 determines whether the element is included in the detection frame. As illustrated in FIGS. 11A and 11B, for example, when some elements are not included in the detection frame, the control unit 700 determines that the element is not included in the detection frame. When all of the elements are included in the detection frame, the control unit 700 determines that the element is included in the detection frame.

As illustrated in FIG. 11A, in the case of a rectangular detection frame 1101, the control unit 700 determines that element A and element B are included in the detection frame 1101. The control unit 700 determines that element C is not included in the detection frame 1101.

As illustrated in FIG. 11B, in the case of a circular detection frame 1102, the control unit 700 determines that element A and element B are included in the detection frame 1102. The control unit 700 determines that element C is not included in the detection frame 1102.

Figure 12:
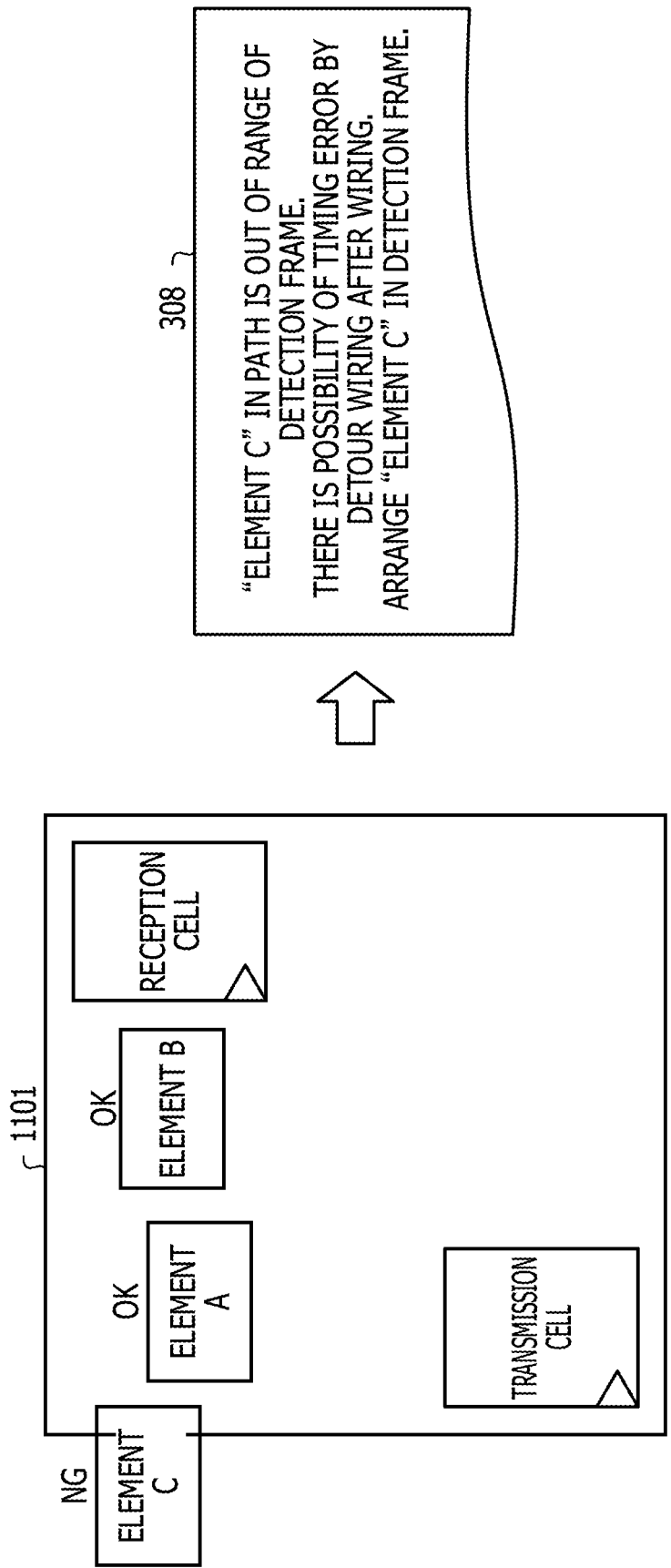
FIG. 12 illustrates an example of a check result output.

FIG. 12 illustrates an example of a check result output. The control unit 700 outputs information indicating that there is a possibility of the detour wiring or the timing error after the completion of the wiring processing, for element C determined not to be included in the detection frame 1101. In FIG. 12, since element C is out of the range of the detection frame 1101, the control unit 700 outputs a check result 308 indicating that there is the possibility of the timing error by the detour wiring and that element C is arranged in the detection frame, after the wiring processing. For example, the control unit 700 may store the check result 308 in the storage unit 101 or the like or may output the content of the check result 308 to the screen of the display 409 or the like.

FIG. 13 illustrates an example of processing performed by the information processing apparatus. The information processing apparatus 100 acquires the timing report 306 obtained by the timing verification after the arrangement processing (operation S1301).

Next, the information processing apparatus 100 acquires the positional information of the intermediate cell of the target path, the positional information of the transmission cell and the reception cell, and the feature information of the target path from the timing report 306 (operation S1302). The information processing apparatus 100 extracts the margin amount from the machine learning DB 301 (operation S1303). The information processing apparatus 100 creates the provisional detection frame based on the positional information of the transmission cell and the reception cell (operation S1304).

The information processing apparatus 100 creates the detection frame to which the margin amount is added (operation S1305). The information processing apparatus 100 checks the detour wiring (operation S1306). The information processing apparatus 100 generates and outputs the check result (operation S1307) and ends a series of processing.

As described above, the information processing apparatus 100 determines whether there is the possibility that the wiring between the respective cells detour by considering whether each cell on the path is included in the frame having the size corresponding to the feature of the target path by referring to the size information of the frame for each path feature. As a result, the information processing apparatus 100 checks the detour wiring that may be caused by the arrangement of the cells before the wiring processing. Therefore, the information processing apparatus 100 may suppress the design rework. Furthermore, the design time may be shortened. Further, since the information processing apparatus 100 determines the size of the detection frame according to the path feature information, detection accuracy of the detour wiring may be enhanced.

The feature information includes at least one of information indicating the frequency of the clock for operating the path, information indicating the distance between the reception cell on the path and an end cell on the path, and information indicating the number of gate stages on the path. For example, as the frequency of the clock becomes larger, the detection frame becomes smaller. Further, the detection frame is smaller as the distance between the reception cell on the path and the end cell on the path becomes larger. As the number of gate stages increases, the detection frame becomes smaller.

The information processing apparatus 100 determines whether each cell of the target path is included in the detection frame of the size based on the size information on the combination of the feature information on the target path and the feature information on the specification of the target circuit. As a result, the information processing apparatus 100 may determine the size of the detection frame according to the feature of the path and the specification of the circuit. Further, the feature information on the specification is, for example, the identification information of the target FPGA. An internal configuration of the FPGA varies depending on the type of FPGA. For example, in the case of the internal configuration of the FPGA in which the detour wiring is easy to occur, when the detection frame is too small, the circuit may not be formed in the FPGA. Further, for example, in the case of the internal configuration of the FPGA in which the detour wiring is difficult to occur, when the detection frame is too large, the detour wiring which becomes the timing error may not be detected. As described above, by changing not only the feature information of the path but also the size information of the detection frame depending on the type of FPGA, the detection accuracy of the detour wiring may be enhanced.

The detour wiring check method described above may be implemented by executing a detour wiring check program prepared beforehand by a computer such as a personal computer or a workstation. This detour wiring check program is recorded on a computer readable recording medium such as a magnetic disk, an optical disk, a universal serial bus (USB) flash memory or the like and is executed by being read from the recording medium by the computer. Further, the detour wiring check program may be distributed via a network such as the Internet or the like.

The information processing apparatus described above may also be implemented by a specific application IC (hereinafter, simply referred to as "ASIC") such as a standard cell or a structured application specific integrated circuit (ASIC) or a programmable logic device (PLD) such as the FPGA. For example, the information processing apparatus may be manufactured by functionally defining the functions of the information processing apparatus described above by the HDL description, logically synthesizing the HDL description, and giving the logically synthesized HDL description to the ASIC or the PLD.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium recording a detour wiring check program for causing a computer to execute a processing, the processing comprising:

acquiring target feature information regarding a target path from a transmission cell to a reception cell with one or more cells interposed therebetween that is to be verified and included in a target circuit to be verified, and target positional information indicating a position of each of the transmission cell, the reception cell and the one or more cells;

storing, in a storage, size information regarding a size of a frame used to determine whether there is a possibility that one or more wirings coupled to the one or more cells interposed between the transmission cell and the reception cell detour corresponding to the target feature information of the target path;

creating a provisional frame that includes the transmission cell and the reception cell of the target path on the target circuit based on the target positional information;

creating the frame by enlarging or reducing the provisional frame based on the size information regarding the size of the frame that corresponds to the target feature information of the target path and is stored in the storage;

determining whether each of the one or more cells between the transmission cell and the reception cell is included in the frame; and when determined that at least one cell among the one or more cells between the transmission cell and the reception cell is not included in the frame, outputting that there is the possibility that a wiring coupled to the at least one cell on the target path that is not included in the frame detours, the at least one cell disposed on the target path that is not included in the frame is also disposed on a path different from the target path.

2. The non-transitory computer-readable recording medium according to claim 1, wherein the target feature information of the target path includes at least one of information indicating a number of gate stages on the target path, information indicating a distance between the transmission cell and the reception cell on the target path, and information indicating a frequency of a clock which operates the target path.

3. The non-transitory computer-readable recording medium according to claim 1, wherein the target feature information of the target path in the target circuit includes a plurality of types of information, and the size information regarding the size of the frame is stored in the storage corresponding to each of combinations between each of the plurality of types of information and feature information of a specification of the target circuit.

4. The non-transitory computer-readable recording medium according to claim 1, wherein in the acquiring, feature information of a specification of the target circuit is acquired, and in the determining, it is determined whether each of the one or more cells between the transmission cell and the reception cell is included in the frame having a size that is determined based on size information regarding a combination of the target feature information and the feature information of the specification of the target circuit.

5. The non-transitory computer-readable recording medium according to claim 3, wherein the feature information of the specification of the target circuit includes identification information of an integrated circuit in which the target circuit is configurable.

6. A detour wiring check method comprising:

acquiring, by a computer, target feature information regarding a target path from a transmission cell to a reception cell with one or more cells interposed therebetween that is to be verified and included in a target circuit to be verified, and target positional information indicating a position of each of the transmission cell, the reception cell and the one or more cells on the target path;

storing, in a storage by the computer, size information regarding a size of a frame used to determine whether there is a possibility that one or more wirings coupled to the one or more cells interposed between the transmission cell and the reception cell detour corresponding to the target feature information of the target path;

creating, by the computer, a provisional frame that includes the transmission cell and the reception cell of the target path on the target circuit based on the target positional information;

creating, by the computer, the frame by enlarging or reducing the provisional frame based on the size information regarding the size of the frame that corresponds to the target feature information of the target path and is stored in the storage;

determining, by the computer, whether each of the one or more cells between the transmission cell and the reception cell is included in the frame; and when determined that at least one cell among the one or more cells between the transmission cell and the reception cell is not included in the frame, outputting, by the computer, that there is the possibility that a wiring coupled to the at least one cell on the target path that is not included in the frame detours, the at least one cell disposed on the target path that is not included in the frame is also disposed on a path different from the target path.

7. The detour wiring check method according to claim 6, wherein the target feature information of the target path includes at least one of information indicating a number of gate stages on the target path, information indicating a distance between the transmission cell and the reception cell on the target path, and information indicating a frequency of a clock which operates the path.

8. The detour wiring check method according to claim 6, wherein the target feature information of the target path in the target circuit includes a plurality of types of information, and the size information regarding the size of the frame is stored in the storage corresponding to each of combinations between each of the plurality of types of information and feature information of a specification of the target circuit.

9. The detour wiring check method according to claim 6, wherein in the acquiring, feature information of a specification of the target circuit is acquired, and in the determining, it is determined whether each of the one or more cells between the transmission cell and the reception cell is included in the frame having a size that is determined based on size information regarding a combination of the target feature information and the feature information of the specification of the target circuit.

10. The detour wiring check method according to claim 8, wherein the feature information of the specification of the target circuit includes identification information of an integrated circuit in which the target circuit is configurable.

11. An information processing apparatus comprising:

a memory; and a processor coupled to the memory and the processor configured to:

acquire target feature information regarding a target path from a transmission cell to a reception cell with one or more cells interposed therebetween that is to be verified and included in a target circuit to be verified, and target positional information indicating a position of each of the transmission cell, the reception cell and the one or more cells;

store, in the memory, size information regarding a size of a frame used to determine whether there is a possibility that one or more wirings coupled to the one or more cells interposed between the transmission cell and the reception cell detour corresponding to the target feature information of the target path;

create a provisional frame that includes the transmission cell and the reception cell of the target path on the target circuit based on the target positional information;

create the frame by enlarging or reducing the provisional frame based on the size information regarding the size of the frame that corresponds to the target feature information of the target path and is stored in the memory;

determine whether each of the one or more cells between the transmission cell and the reception cell is included in the frame; and when determined that at least one cell among the one or more cells between the transmission cell and the reception cell is not included in the frame, output that there is the possibility that a wiring coupled to the at least one cell on the target path that is not included in the frame detours, the at least one cell disposed on the target path that is not included in the frame is also disposed on a path different from the target path.

12. The information processing apparatus according to claim 11, wherein the target feature information of the target path includes at least one of information indicating a number of gate stages on the target path, information indicating a distance between the transmission cell and the reception cell on the target path, and information indicating a frequency of a clock which operates the target path.

13. The information processing apparatus according to claim 11, wherein the target feature information of the target path in the target circuit includes a plurality of types of information, and the size information regarding the size of the frame is stored in the memory corresponding to each of combinations between each of the plurality of types of information and feature information of a specification of the target circuit.

14. The information processing apparatus according to claim 11, wherein in the acquiring, feature information of a specification of the target circuit is acquired, and in the determining, it is determined whether each of the one or more cells between the transmission cell and the reception cell is included in the frame having a size that is determined based on size information regarding a combination of the target feature information and the feature information of the specification of the target circuit.

15. The information processing apparatus according to claim 13, wherein the feature information of the specification of the target circuit includes identification information of an integrated circuit in which the target circuit is configurable.

* * * * *